(12) United States Patent
Moskowitz et al.

(10) Patent No.: US 9,736,647 B2
(45) Date of Patent: Aug. 15, 2017

(54) METHOD, APPARATUS, AND SYSTEM FOR NETWORK IDENTIFIER SUPRESSION

(71) Applicant: Verizon Patent and Licensing Inc., Arlington, VA (US)

(72) Inventors: Robert Moskowitz, Oak Park, MI (US); Paul Hubner, McKinney, TX (US); Paul Hubbard, San Diego, CA (US); Abby Charfauros, San Diego, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 226 days.

(21) Appl. No.: 14/219,780

(22) Filed: Mar. 19, 2014

(65) Prior Publication Data

US 2015/0271742 A1 Sep. 24, 2015

(51) Int. Cl.
*H04W 4/02* (2009.01)
*H04W 8/00* (2009.01)
*H04W 48/04* (2009.01)
*H04W 48/18* (2009.01)
*H04W 88/08* (2009.01)

(52) U.S. Cl.
CPC ........... *H04W 4/025* (2013.01); *H04W 8/005* (2013.01); *H04W 48/04* (2013.01); *H04W 48/18* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 2008/0151842 A1* | 6/2008 | Tysowski | ............... | H04W 48/16 370/338 |
| 2011/0116453 A1* | 5/2011 | Huang | .................. | H04W 48/18 370/329 |
| 2012/0023561 A1* | 1/2012 | Saida | ....................... | G06F 21/31 726/6 |
| 2013/0064132 A1* | 3/2013 | Low | ....................... | H04W 24/02 370/254 |
| 2014/0269657 A1* | 9/2014 | Kim | ....................... | H04W 8/005 370/338 |
| 2014/0293333 A1* | 10/2014 | Asai | ....................... | G06F 3/1236 358/1.15 |
| 2014/0376654 A1* | 12/2014 | Byun | .................... | H04B 7/0452 375/267 |

\* cited by examiner

*Primary Examiner* — Yaotang Wang (57) ABSTRACT

A method, apparatus, and system for detection of a network are described. A network list indicating a plurality of network identifiers associated with a mobile device is determined. Each network identifier identifies one or more access points for a respective wireless network. Locality information is determined based on one or more sensors of the mobile device. At least one of the plurality of network identifiers is selected based on the locality information. And a transmission of the selected network identifiers by the mobile device is initiated.

21 Claims, 10 Drawing Sheets

| SSID | SENSORS | SHARE |
|---|---|---|
| SSID1 | CELL STRENGTH + BT STRENGTH + GPS | NO |

701 — SSID column
703 — SENSORS column
705 — SHARE column
700

METHOD, APPARATUS, AND SYSTEM FOR NETWORK IDENTIFIER SUPRESSION

BACKGROUND INFORMATION

Networking technologies offer users the ability to quickly detect and connect to previously connected networks by broadcasting all network identifiers known, for instance, a service set identifier (SSID) of a preferred network list (PNL). Such broadcasting may allow for a rapid network setup. However, broadcasting of all network identifiers known may inadvertently disclose private information of mobile devices and associated users such as names of networks previously connected or accessed by the mobile device. Moreover, some devices may use broadcasted names of networks to further expose information.

Therefore, there is a need for approaches for detection of a network having improved privacy and a rapid network setup, particularly when detecting networks using a SSID of a PNL.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred method, apparatus, and system for detection of a network is described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Figure 1:
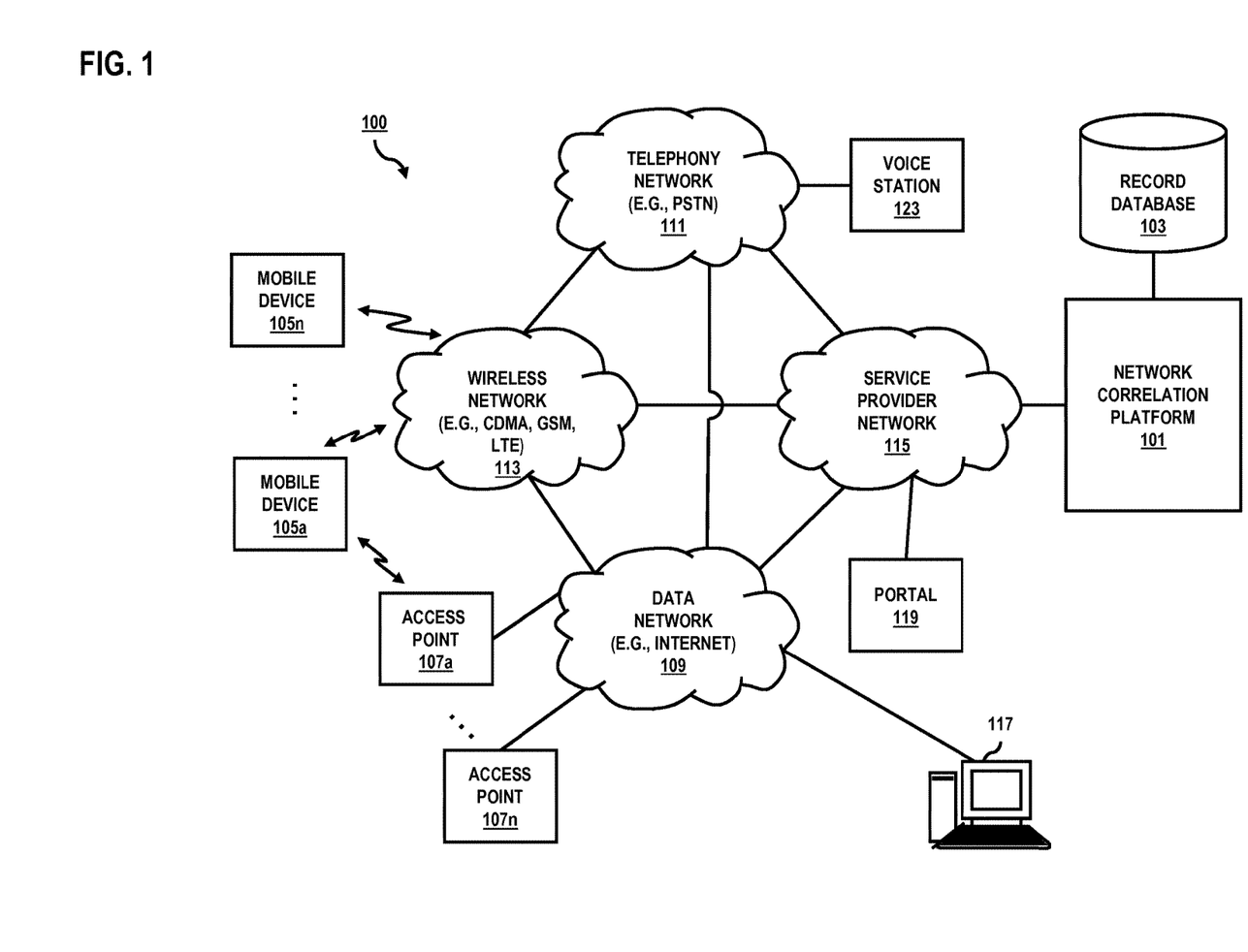
FIG. 1 is a diagram of a communication system capable of detecting a network, according to various embodiments.

FIG. 1 is a diagram of a communication system capable of detecting a network, according to various embodiments. For illustrative purposes, system 100 is described with respect to a network correlation platform 101. In this example, the platform 101 is configured to facilitate a connection between mobile devices 105 and access points 107 using a record database 103. In one embodiment, the mobile device 105a detects sensor data (e.g., a cellular tower connection) and the mobile device 105a and/or platform 101 identifies a network identifier (e.g., SSID) for connecting to an access point (e.g., 107a). The platform 101 may identify the network identifier based on records maintained in database 103. In this manner, the platform 101 is configured to facilitate a connection between mobile devices 105 and access points 107 without a broadcast of all known network identifiers.

As mentioned, mobile devices (e.g., 105) may inadvertently disclose information about a device and user when broadcasting all known SSIDs of a PNL. However, communication technologies have continued to expand in capabilities, and thus more and more mobile devices 105 may have hardware capabilities enabling a detection of locality information (e.g., a signal strength, neighboring WiFi access points, compass strength, GPS location, time, etc.).

To address this issue, the system 100 of FIG. 1 introduces the capability to select a network identifier based on locality information. For instance, the platform 101 selects a network identifier corresponding to access point 107a when mobile device 105a receives a broadcast from access point 107b based on a previous determination indicating that access points 107a and 107b are proximate to each other. In one embodiment, the platform 101 selects a network identifier based on sensor datum of other devices and/or users. For instance, the platform 101 selects access point 107a for mobile device 105a when mobile device 105a detects a signal strength to a particular cellular tower that was previously detected by mobile device 105b while connected to access point 107a. It is noted that such sharing of sensor datum may be selected by users of the platform 101 and may include "opt-in" or "opt-out" processes as may be appropriate for the situation and type of information.

In certain embodiments, platform 101 and/or mobile devices 105 may include or have access to records in database 103. A record may include a network identifier (e.g., SSID) and an indication of a correlation of the network identifier with sensor data. Additionally, a record may be associated with account sharing information, such as, for instance, a user name, mobile device number (MDN), privacy profile, sharing preference information, and the like. The platform 101 and/or mobile devices 105 may maintain a table listing (e.g., extended PNL (ePNL)) a record for each SSID and/or BSSID listed in a network list (e.g., PNL).

As used herein, mobile devices 105 may be any type of mobile terminal including a mobile handset, mobile station, mobile unit, multimedia computer, multimedia tablet, communicator, netbook, Personal Digital Assistants (PDAs), smartphone, media receiver, etc. Mobile devices 105 may be configured to detect networks and/or access points (e.g., 107) actively, passively, or according to a user input (e.g., manually entered SSID). Additionally, or alternatively, mobile devices 105 may generate and/or maintain a network list (e.g., PNL) indicating known access points, network identifiers (e.g., SSIDs) associated with known access points, etc. It is also contemplated that the mobile devices 105 may support any type of interface for supporting the presentment or exchange of data. In addition, mobile devices 105 may facilitate various input means for receiving and generating information, including touch screen capability, keyboard and keypad data entry, voice-based input mechanisms, accelerometer (e.g., shaking the mobile device 105), and the like. Any known and future implementations of mobile devices 105 are applicable. It is noted that, in certain embodiments, the mobile devices 105 may be configured to transmit information (e.g., audio signals, words, address, etc.) using a variety of technologies—e.g., NFC, BLUETOOTH, infrared, etc. Also, connectivity may be provided via a wireless local area network (LAN). By way of example, a group of mobile devices 105 may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each mobile device 105.

As used herein, access point 107 may be any type of device that allows a connection to a network. For instance, the access point 107 may connect to mobile devices 105 using a wireless connection (e.g., WiFi, WiMAX, etc.) and to one or more networks 109-115 using a wired connection. In one embodiment, each access point 107 is assigned or associated with a unique identifier, for instance a basic service set identifier (BSSID), a media access control (MAC) address, and the like. Some access points 107 may be mobile by design, for instance, portable devices utilizing wireless communications (e.g., WiFi, LTE, CDMA, WIMAX, etc).

In some embodiments, platform 101, the mobile devices 105, and other elements of the system 100 may be configured to communicate via one or more networks, such as the data network 109, the telephony network 111, and/or the wireless network 113. According to certain embodiments, networks 109-113 may interact with the service provider network 115. The networks 109-115 may be any suitable wireline and/or wireless network, and be managed by one or more service providers. For example, the data network 109 may be any local area network (LAN), metropolitan area network (MAN), wide area network (WAN), the Internet, or any other suitable packet-switched network, such as a commercially owned, proprietary packet-switched network, such as a proprietary cable or fiber-optic network. For example, computing device 117 may be any suitable computing device, such as a VoIP phone, skinny client control protocol (SCCP) phone, session initiation protocol (SIP) phone, IP phone, personal computer, softphone, workstation, terminal, server, etc. The telephony network 111 may include a circuit-switched network, such as the public switched telephone network (PSTN), an integrated services digital network (ISDN), a private branch exchange (PBX), or other like network. For instance, voice station 123 may be any suitable plain old telephone service (POTS) device, facsimile machine, etc. Meanwhile, the wireless network 113 may employ various technologies including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like.

Although depicted as separate entities, the networks 109-115 may be completely or partially contained within one another, or may embody one or more of the aforementioned infrastructures. For instance, the service provider network 115 may embody circuit-switched and/or packet-switched networks that include facilities to provide for transport of circuit-switched and/or packet-based communications. It is further contemplated that the networks 109-115 may include components and facilities to provide for signaling and/or bearer communications between the various components or facilities of the system 100. In this manner, the networks 109-115 may embody or include portions of a signaling system 7 (SS7) network, Internet protocol multimedia subsystem (IMS), or other suitable infrastructure to support control and signaling functions.

In one embodiment, the service provider network 115 includes a service provider portal 119 providing, for example, a web-based user interface to allow users to exchange network identifiers among a user's devices, to indicate sharing preference information, and the like.

According to one embodiment, network correlation platform 101 may be implemented, at least partially, in mobile devices 105. It is noted that network detection and/or correlation may be part of managed services supplied by a service provider as a hosted or subscription-based service made available to users of the mobile devices 105 through a service provider network 115. As shown, platform 101 may be a part of or connected to the service provider network 115. In certain embodiments, users (e.g., subscribers) may utilize a plurality of mobile devices 105 (e.g., laptop, desktop, web appliance, netbook, etc.) to connect to access points 107.

While specific reference will be made thereto, it is contemplated that the system 100 may embody many forms and include multiple and/or alternative components and facilities.

Figure 2:
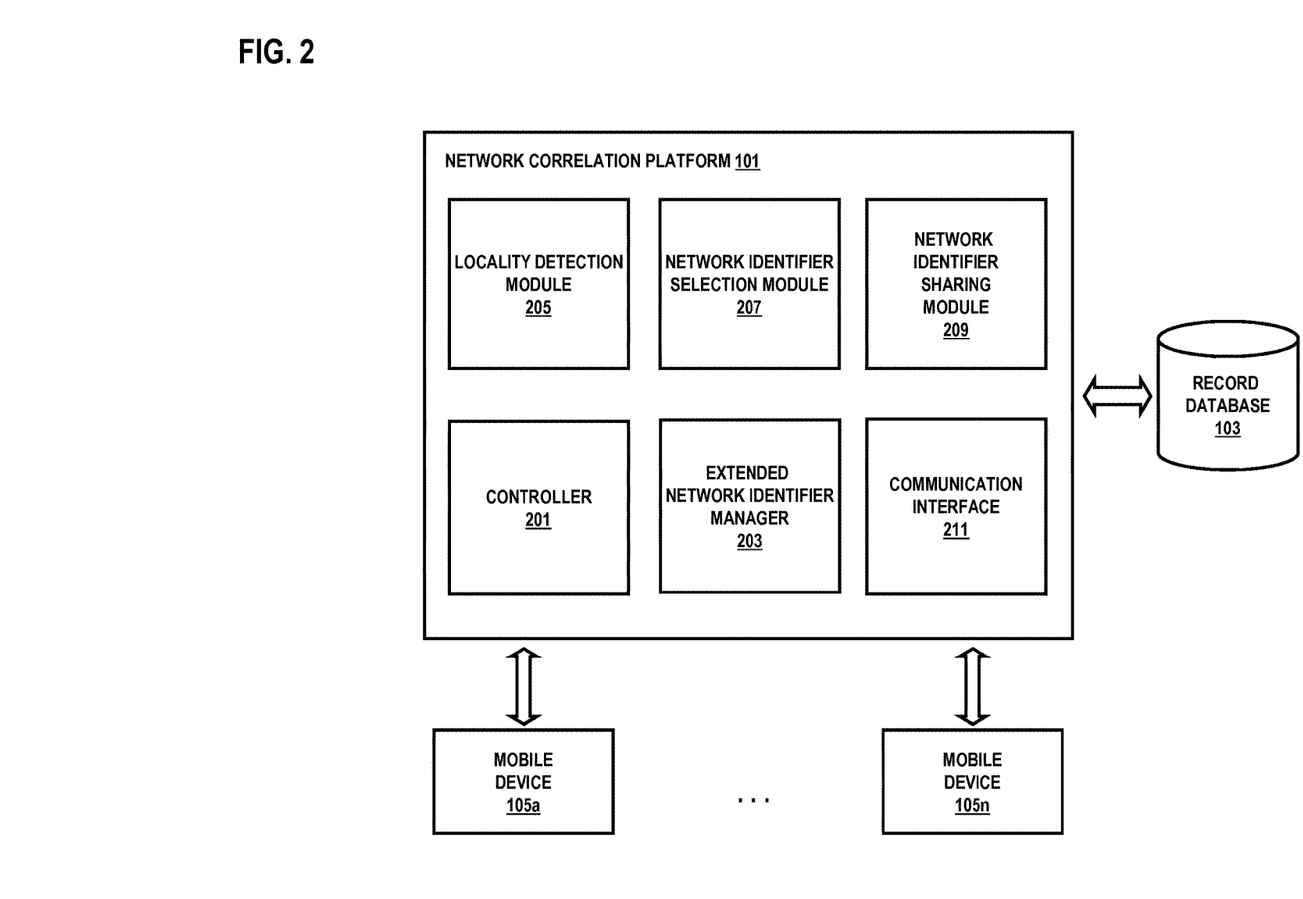
FIG. 2 is a diagram of the components of a network correlation platform, according to one embodiment.

FIG. 2 is a diagram of the components of platform 101, according to one embodiment. The platform 101 may comprise computing hardware (such as described with respect to FIGS. 8 through 10), as well as include one or more components configured to execute the processes described herein for detecting a network. It is contemplated that the functions of these components may be combined in one or more components or performed by other components of equivalent functionality. In one implementation, platform 101 includes a controller 201, extended network identifier manager 203, locality detection module 205, network identifier selection module 207, network identifier sharing module 209, and communication interface 211.

The controller 201 may execute at least one algorithm for executing functions of platform 101. For example, the controller 201 may interact with the communication interface 211 to facilitate a connection of mobile devices 105 with access points 107. The controller 201 may then interact with the mobile devices 105 to cause, for instance, a detection of sensor information to determine locality information to be used by extended network identifier manager 203, network identifier selection module 207, and network identifier sharing module 209.

The extended network identifier manager 203 may correlate an access point (e.g., 107) with sensor data. By way of example, the extended network identifier manager 203 causes mobile device 105a to detect sensor data while connected to access point 107a and correlates access point 107a with the sensor data. The extended network identifier manager 203 may generate a list of records (e.g., ePNL) indicating sensor data for one or more access points 107 and store the records in a mobile device (e.g., 105a), mobile devices (e.g., 105), record database 103, and the like.

In one embodiment, the extended network identifier manager 203 accesses a network list (e.g., PNL) associated with (e.g., residing in a local cache of, residing in a remote store accessible to, etc.) a mobile device to generate a list of records (e.g., ePNL). As used herein a PNL refers to, for instance, a list of previously attached and/or known access points (e.g., 107) that have been connected to a mobile device (e.g., 105) and may indicate network identifiers (e.g., SSIDs). Such SSIDs may indicate an attachable name of an access point for a wireless network (e.g., WIMAX, WiFI, etc). It is noted that multiple access points may be designated a single SSID and SSIDs may or may not be published (e.g., shared) or broadcast. In some embodiments, users may rank or reorder PNL entries (e.g., records) in order of preference in location, for instance, secure over unsecure, or home over café, downstairs, hidden over visible, etc. Additionally, an ePNL refers to, for example, a correlation of sensor data with one or more records (e.g., PNL entries). It is noted that an ePNL may associate sensor data with a network identifier, such as a SSID, BSSID, and the like. The records (e.g., an ePNL) may be retained within a datastore (e.g., local cache) of an associated mobile device and/or in a remote repository (e.g., network repository 103), for instance, of service provider network 115. Furthermore, such records may indicate a particular sensor (e.g., radio, BLUETOOTH, NFC, RFID, etc.) of a mobile device, operation mode (e.g., channel, frequency range, etc.), associated with an SSID and/or BSSID of an access point. Additionally, such records indicate mobile access points as locality information and/or sensor data points or ignore or omit mobile access points as unreliable or occasional signals.

The locality detection module 205 may determine locality information associated with an access point. In one embodiment, the detection module 205 selects sensor data to detect. By way of example, the detection module 205 selects a sensor or a group of sensors from a set of available sensors based on an energy expenditure of each sensor of the set and/or a time. Additionally, or alternatively, the detection module 205 selects an operating mode of a sensor from a set of operating modes based on an energy expenditure of each operating mode of the set. In yet another example, the detection module 205 initiates a detection of sensor data based on an availability, an initiation, or an establishing of a connection (e.g., attachment) with an access point 107. In some embodiment, the locality detection module 205 utilizes locality information in determining sensor data to detect. For instance, if locality information indicates a selection of many network identifiers, the locality detection module 205 may select sensors and/or operating modes of sensors to further reduce the number network identifiers selected.

Network identifier selection module 207 selects a network identifier. In one embodiment, the selection module 207 selects a network identifier based on locality information and a record indicating network identifiers and corresponding sensor data. By way of example, selection module 207 compares locality information with sensor data in an extended network identifier list (e.g., ePNL) and selects network identifiers (e.g., SSIDs) corresponding with sensor data corresponding to (e.g., overlapping) the locality information. It is noted that traditional methods may be used when no records of the extended network identifier list indicate sensor data corresponding with the locality information. Moreover, a transmission (e.g., broadcast) of the selected network identifier may exclude (e.g., not transmit) other network identifier(s) (e.g., SSID(s)) to improve user privacy.

Network identifier sharing module 209 selectively provides access to records. In one embodiment, the sharing module 209 provides access to records based on sharing preference information. By way of example, the sharing module 209 receives a record from mobile device 105a and sharing preference information indicating that the record may be shared to devices (e.g., 105) associated with a group users (e.g., all employees of a company, family share plan members, etc.), a particular device or devices associated with a particular user, published, etc. Thus, the sharing module 209 may share the record with devices according to the sharing preference information.

The platform 101 may further include a communication interface 211 to communicate with other components of platform 101, the mobile devices 105, access points 107, and other components of the system 100. The communication interface 211 may include multiple means of communication. For example, the communication interface 211 may be able to communicate over short message service (SMS), multimedia messaging service (MMS), internet protocol, instant messaging, voice sessions (e.g., via a phone network), email, NFC, QR code, or other types of communication. Additionally, communication interface 211 may include a web portal (e.g., service provider portal 119) accessible by, for example, mobile device 105, computing device 117, and the like.

It is contemplated that to prevent unauthorized access, platform 101 may include an authentication identifier when transmitting signals to and from mobile devices 105. For instance, control messages may be encrypted, either symmetrically or asymmetrically, such that a hash value can be utilized to authenticate received control signals, as well as ensure that those signals have not been impermissibly alerted in transit. As such, communications between the mobile devices 105 and platform 101 may include various identifiers, keys, random numbers, random handshakes, digital signatures, and the like.

Figure 3:
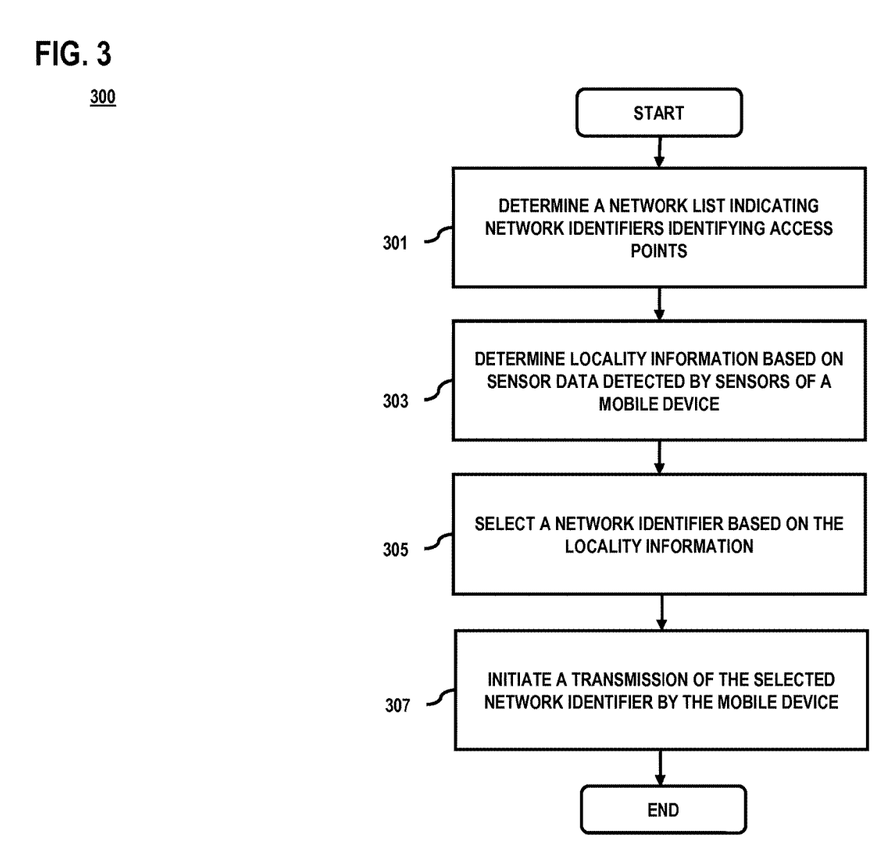
FIG. 3 is a flowchart of a process for network detection, according to one embodiment.

FIG. 3 is a flowchart of a process for detecting a network, according to one embodiment. For illustrative purpose, process 300 is described with respect to the systems of FIGS. 1 and 2. It is noted that the steps of process 300 may be performed in any suitable order, as well as combined or separated in any suitable manner. The process 300 may be performed, for example, by platform 101, mobile devices 105, or a combination thereof.

In step 301, the extended network identifier manager 203 determines a network list indicating network identifiers identifying access points. For example, the extended network identifier manager 203 determines a PNL list stored in memory of a mobile device (e.g., 105a), a remote log (e.g., record database 103), and the like. Next, in step 303, the detection module 205 determines locality information based on sensor data detected by sensors of a mobile device. By way of example, detection module 205 causes mobile device 105a to determine a signal strength and cellular tower connecting mobile device 105a to wireless network 113, a BLUETOOTH signal strength to a particular device (e.g., headset), and a GPS location. In step 305, network identifier selection module 207 selects a network identifier based on the locality information. For instance, the network identifier selection module 207 selects each network identifier of an ePNL that corresponds to any one of the signal strength and cellular tower, BLUETOOTH signal strength to the particular device, GPS location, BLUETOOTH advertisement, LED communication, and the like. In another example, the network identifier selection module 207 selects each network identifier of an ePNL that corresponds to all of locality information. The platform 101, in step 307, initiates a transmission (e.g., broadcast) of the selected network identifier by the mobile device (e.g., 105a). For instance, the selection and/or reception by mobile device 105 of an indication of the selection of the network identifier initiates a transmission of the selected network identifier(s) (e.g., SSID(s)) by mobile device 105a. Moreover, the transmission (e.g., broadcast) of the selected network identifier by the mobile device 105 may exclude (e.g., not transmit) other network identifier(s) (e.g., SSID(s)), thereby reducing inadvertent disclosure of private information of mobile devices and improving user privacy.

Figure 4:
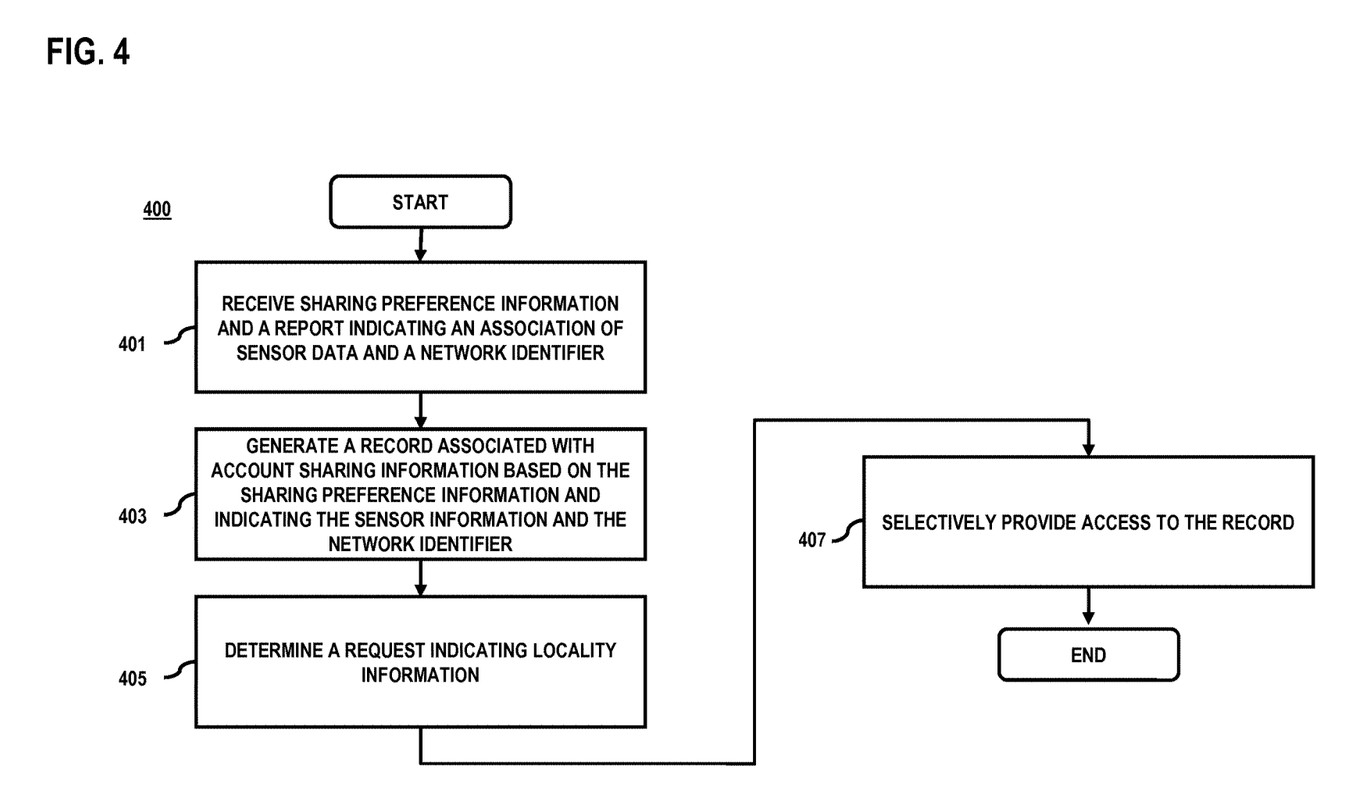
FIG. 4 is a flowchart of a process for sharing a record indicating sensor data and a network identifier, according to one embodiment.

FIG. 4 is a flowchart of a process for sharing a record indicating sensor data and a network identifier, according to one embodiment. For illustrative purpose, process 400 is described with respect to the systems of FIGS. 1 and 2. The steps of process 400 may be performed in any suitable order, as well as combined or separated in any suitable manner. The process 400 may be performed, for example, by platform 101.

In step 401, the sharing module 209 receives sharing preference information and a report indicating an association of sensor data and a network identifier. For instance, the sharing module 209 receives the report from mobile device 105a and determines sharing preference information for the mobile device 105a according to one or more logs (not shown) associated with service provider network 115.

In step 403, the sharing module 209 generates a record associated with the account sharing information based on the sharing preference information and indicating the sensor information and the network identifier. By way of example, the sharing module 209 stores the record with an account sharing information indicating the sharing preference information with the record in database 103. In one embodiment, the sharing module 209 generates a combination record based on the record and another record. By way of example, the sharing module 209 accesses the records of Table 1 from database 103 to generate a COMBO record.

TABLE 1

| ACCOUNT | DEVICE | SSID | SENSORS | SHARE |
|---|---|---|---|---|
| A | ePNL 1 | SSID1 | CELL STRENGTH + BT STRENGTH + GPS | NO |
| A | ePNL 2 | SSID2 | CELL STRENGTH | YES |
| B | ePNL 3 | SSID2 | OTHER SSID STRENGTHS | YES |
| C | ePNL 4 | SSID3 | OTHER SSID STRENGTHS + COMPASS | NO |
| COMBO | ePNL 2 & 3 | SSID2 | CELL STRENGTH + OTHER SSID STRENGTHS | YES |

In the example, the sharing module 209 generates the COMBO record that includes sensor data (e.g., cell strength) from a first ePNL '2' of a first account 'A' and sensor data (e.g., other SSID strengths) from a second ePNL '3' of a second account 'B'. Such a merging of records may allow better resolution.

The platform 101 then, in step 405, receives a request indicating locality information corresponding to the sensor information. For instance, mobile device 105a and/or platform 101 determines locality information for mobile device 105a, determines that an ePNL of mobile device 105a contains no records indicating sensor information corresponding to the locality information, and accordingly initiates a request indicating the locality information to the platform 101. Next, in step 407, the sharing module 209, selectively provides access to the record. For instance, the sharing module 209 determines user account information according to a user account associated with mobile device 105b and provides mobile device 105a access to the COMBO record if the account sharing information indicates the user account information has permission to access the record as shown in Table 1. Additionally, the platform 101 may determine whether the record indicates sensor data corresponding to the locality information indicated by the request.

Figure 5:
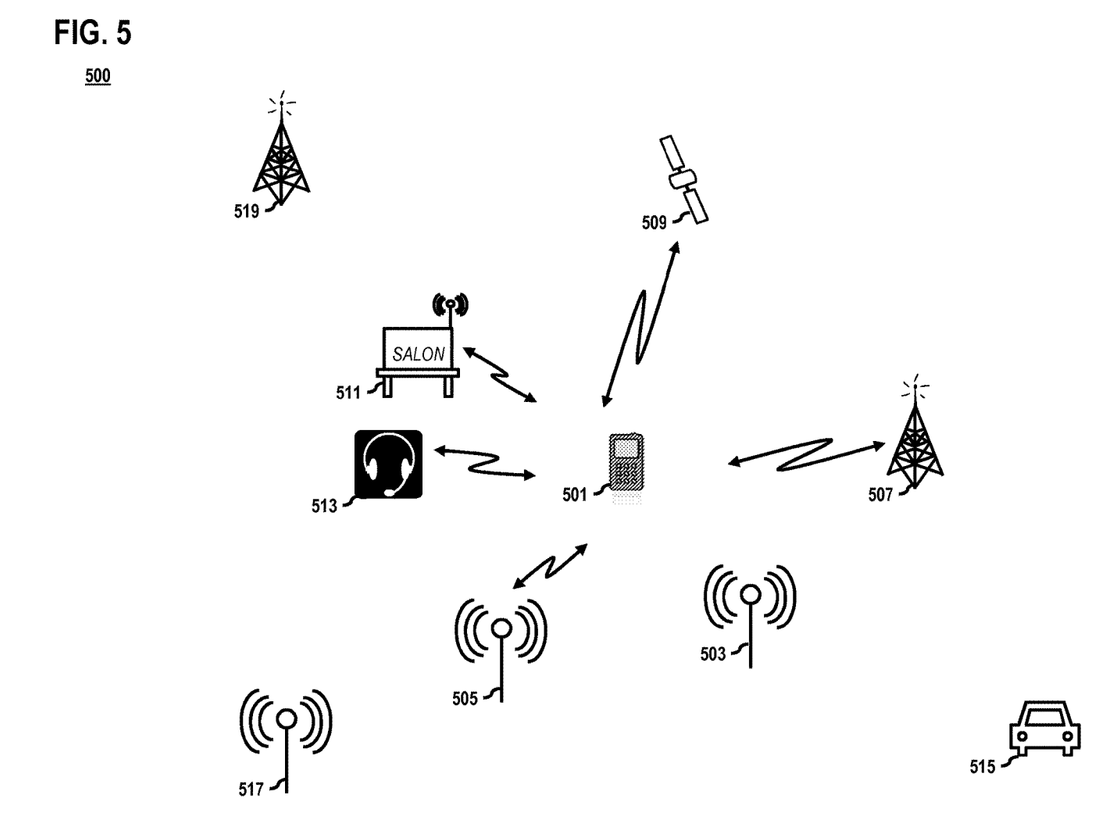
FIG. 5 illustrates a detection of a network, according to one embodiment.

FIG. 5 illustrates a detection of a network, according to one embodiment. As shown, a mobile device 501 (e.g., 105) determines locality information for detecting access point 503 by sensor data received from access point 505, cellular tower 507, satellite (e.g., GPS) 509, NFC 511, and a BLUETOOTH headset 513. In one embodiment, the mobile device 501 scans for particular sensor data from, for instance, a BLUETOOTH configured automobile 515, home access point 517, and cellular tower 519. In this manner, locality information may be determined by a detection of sensor data and by an absence of sensor data.

In one embodiment, the platform 101 (and/or mobile device 501) selects sensors of mobile device 501 based on energy information of sensors used to detect sensor data. By way of example, the platform 101 (and/or mobile device 501) selects a radio (e.g., always on) to connect with cellular tower 507 and thus locality information and/or network identifiers are determined based on the connection to cellular tower 507. When no network identifiers are identified, or too many network identifiers are identified, the platform 101 (and/or mobile devices 501) selects a (low power) radio to turn on to scan for a NFC signal, and the locality information is updated to include sensor data detected from NFC 511. Similarly, the platform 101 (and/or mobile device 501) may select various other (higher power) sensors (e.g., radios) according to energy expenditures of detecting access point 505, satellite (e.g., GPS) 509, and BLUETOOTH headset 513.

In some embodiments, the platform 101 (and/or mobile device 501) selects operating modes of mobile device 501 based on energy information of operating modes used to detect sensor data. By way of example, the platform 101 (and/or mobile device 501) selects a (low power) operating mode for detecting access points 505 and 517 on a last known channel and/or frequency to reduce energy expenditures of detecting access points 505 and 517. Additionally, if the mobile device 501 is unable to detect access points 505 and 517, the platform 101 (and/or mobile device 501) selects a (high power) operating mode scanning other (e.g., all) channels and/or frequencies of the access points 505 and 517.

Furthermore, the mobile device 501 may select sensors and/or operating modes based on a number of selected network identifiers and/or locality information. By way of example, the platform 101 (and/or mobile device 501) selects a sensor to scan for NFC 511 when locality information indicates a proximity to cellular tower 507. The platform 101 may then select a network identifier for access point 503 only when locality information indicates a proximity to both the cellular tower 507 and the NFC 511.

Figure 6:
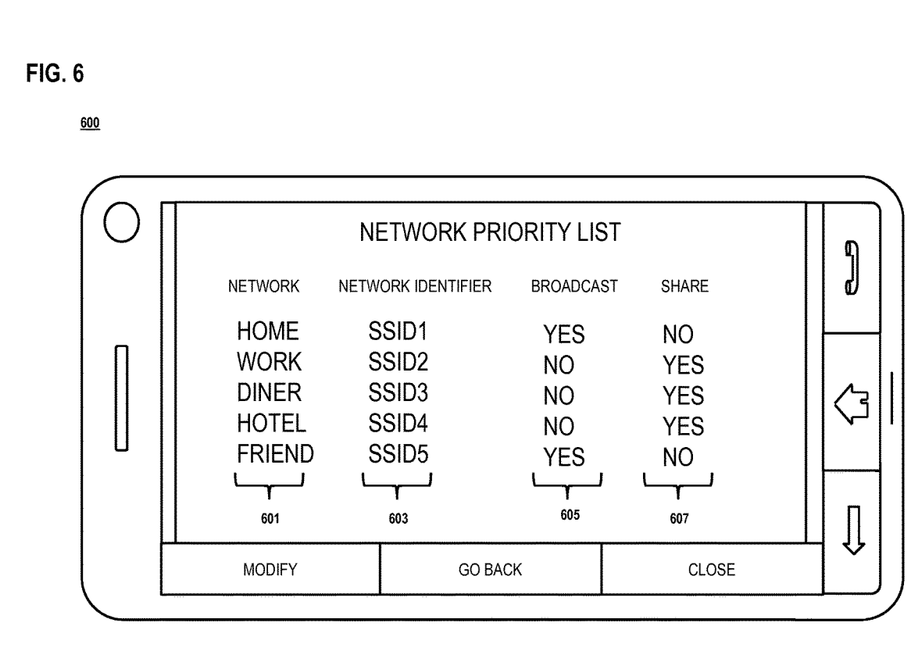
FIG. 6 illustrates a graphical user interface for detecting a network, according to one embodiment.

FIG. 6 illustrates a graphical user interface for detecting a network, according to one embodiment. As shown, FIG. 6 includes a graphical user interface 600 of a mobile device (e.g., 105) that indicates network names 601, network identifiers 603, indicators 605 of whether the network identifiers are selected (by the platform 101) to broadcast, and indicators 607 of whether sensor data associated with each network 601 is shared with the platform 101 and/or other users. The network list 601 is ranked, for instance, to connect to a "home" network first, and if unavailable to a "work" network second, etc. Moreover, the interface 600 is configured to detect an input indicating a repositioning of one network (e.g., home) in the network list 601, for instance, by a drag-and-drop function. Further, the share indicators 607 may be configured to toggle (e.g., move from a shared state to a not shared state), for instance, by detecting a touch function over a particular indicator of indicators 607.

Figure 7:
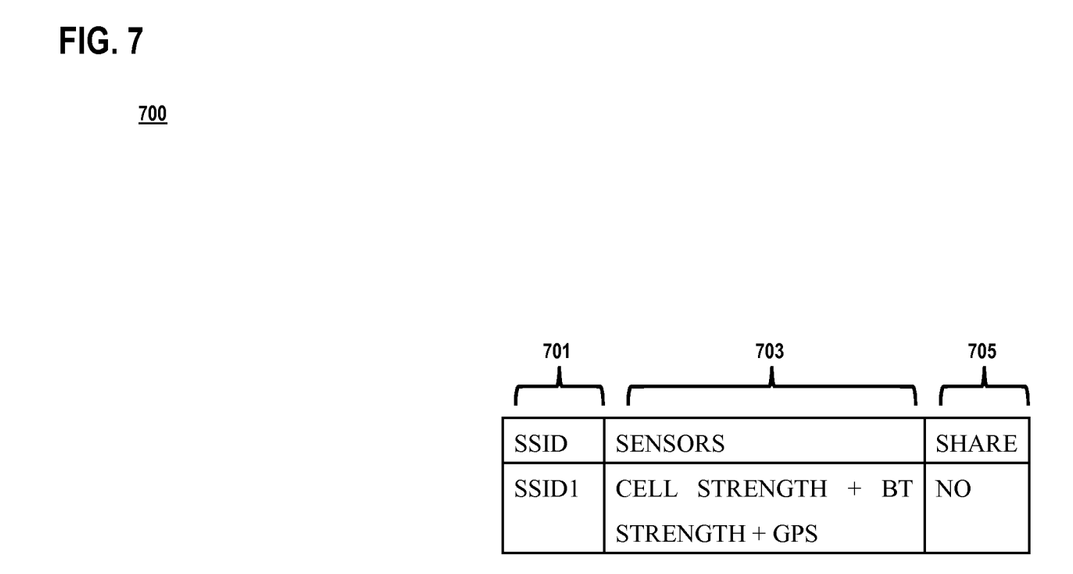
FIG. 7 illustrates an exemplary record for detecting a network, according to one embodiment.

FIG. 7 illustrates an exemplary record for detecting a network, according to one embodiment. As shown, record 700 includes network identifier 701, sensor information 703, and account sharing information 705. The network identifier 701 is any attachable name indicating an access point (e.g., 107), for instance, an SSID. The sensor information 703 indicates sensor datum, for instance, a relative signal strength to various devices (e.g., cellular towers, WiFI access points, etc.), compass strength, vibration signatures, local BLUETOOTH, BLUETOOTH advertisements, NFC, RFID, and the like. The account sharing information 705 is based on account sharing preference information of users and/or devices detecting the sensor datum. As noted above, users (e.g., subscribers of network 115) may indicate preferences to share sensor data as illustrated in FIG. 4.

The processes for detecting a network described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
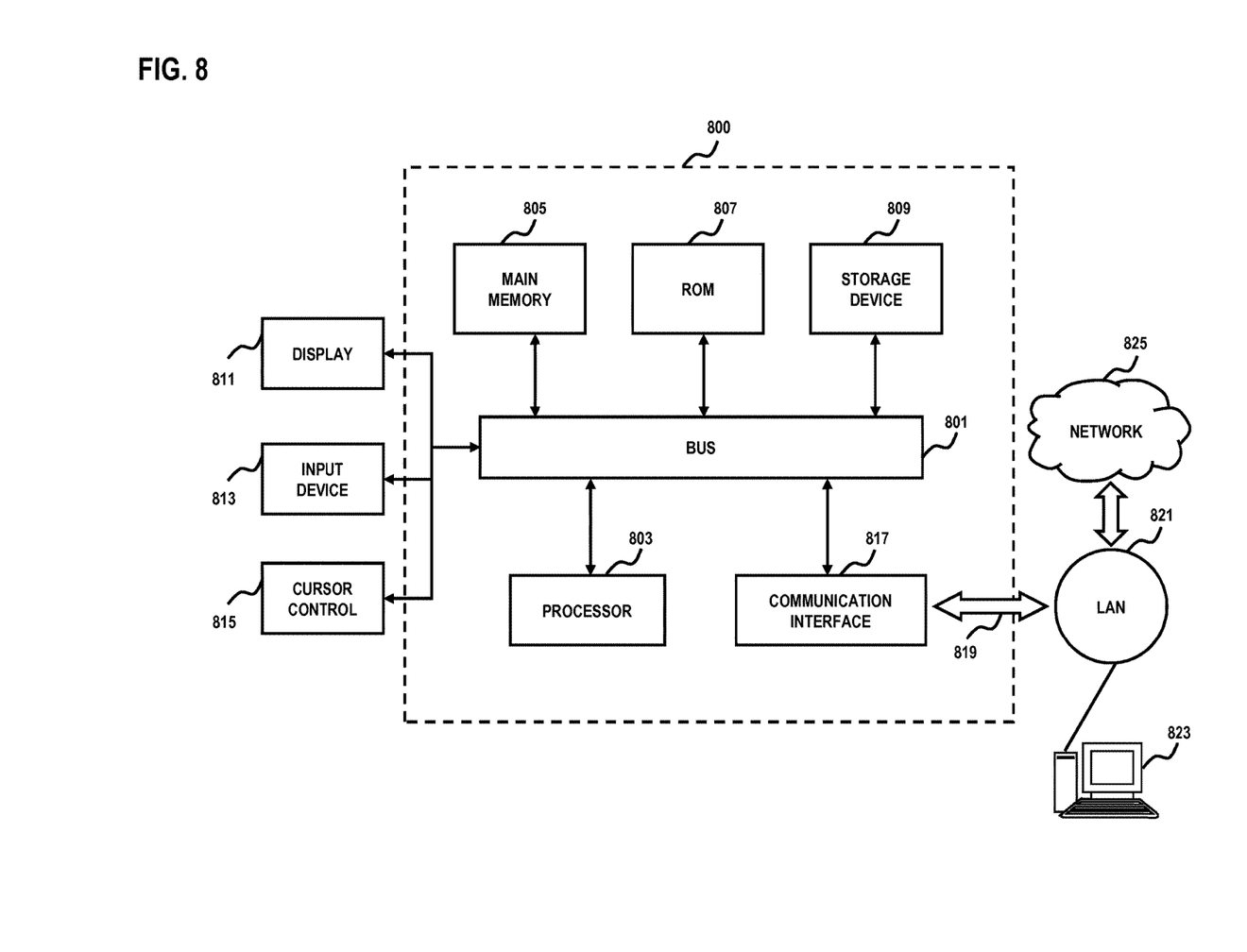
FIG. 8 is a diagram of a computer system that can be used to implement various exemplary embodiments.

FIG. 8 is a diagram of a computer system that can be used to implement various exemplary embodiments. The computer system 800 includes a bus 801 or other communication mechanism for communicating information and one or more processors (of which one is shown) 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk, flash storage, or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. Additional output mechanisms may include haptics, audio, video, etc. An input device 813, such as a keyboard including alphanumeric and other keys, is coupled to the bus 801 for communicating information and command selections to the processor 803. Another type of user input device is a cursor control 815, such as a mouse, a trackball, touch screen, or cursor direction keys, for communicating direction information and command selections to the processor 803 and for adjusting cursor movement on the display 811.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to computer-readable storage medium ((or non-transitory)—e.g., non-volatile media and volatile media), and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 9:
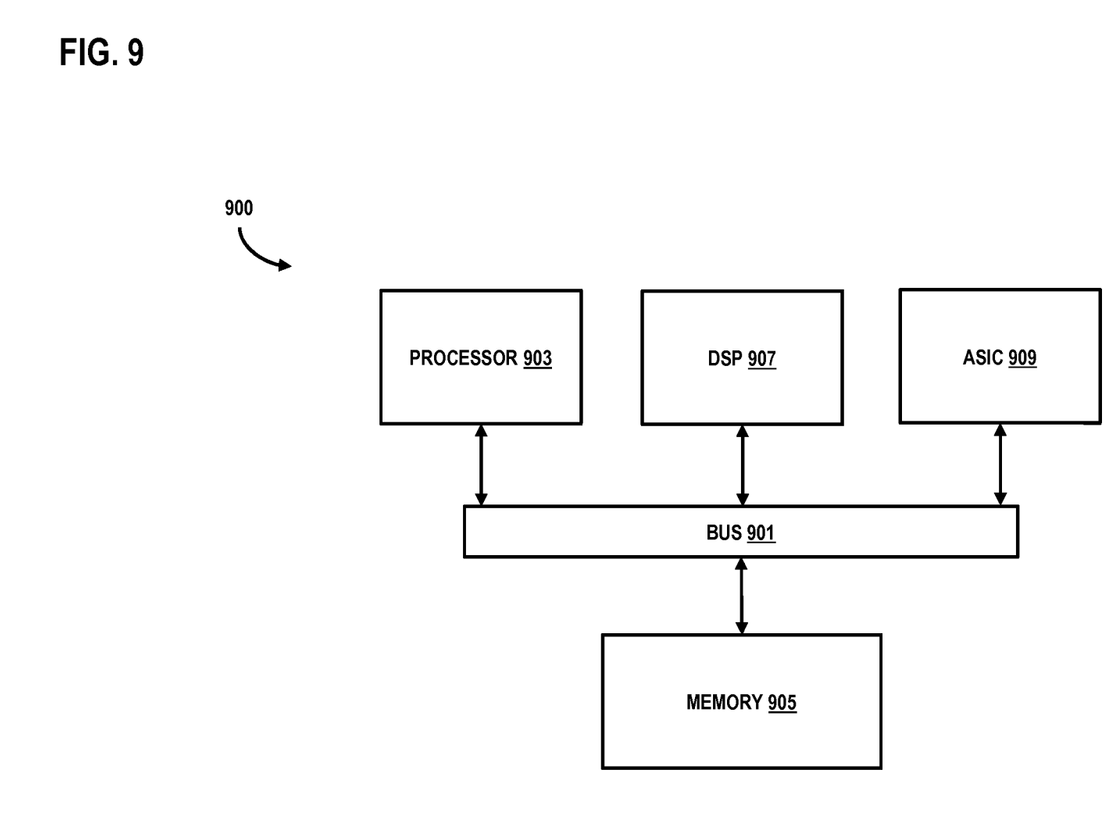
FIG. 9 is a diagram of a chip set that can be used to implement various exemplary embodiments.

FIG. 9 illustrates a chip set or chip 900 upon which an embodiment of the invention may be implemented. Chip set 900 is programmed to enable a detection of a network as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of enabling a detection of a network.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to enable detection of a network. The memory 905 also stores the data associated with or generated by the execution of the inventive steps.

Figure 10:
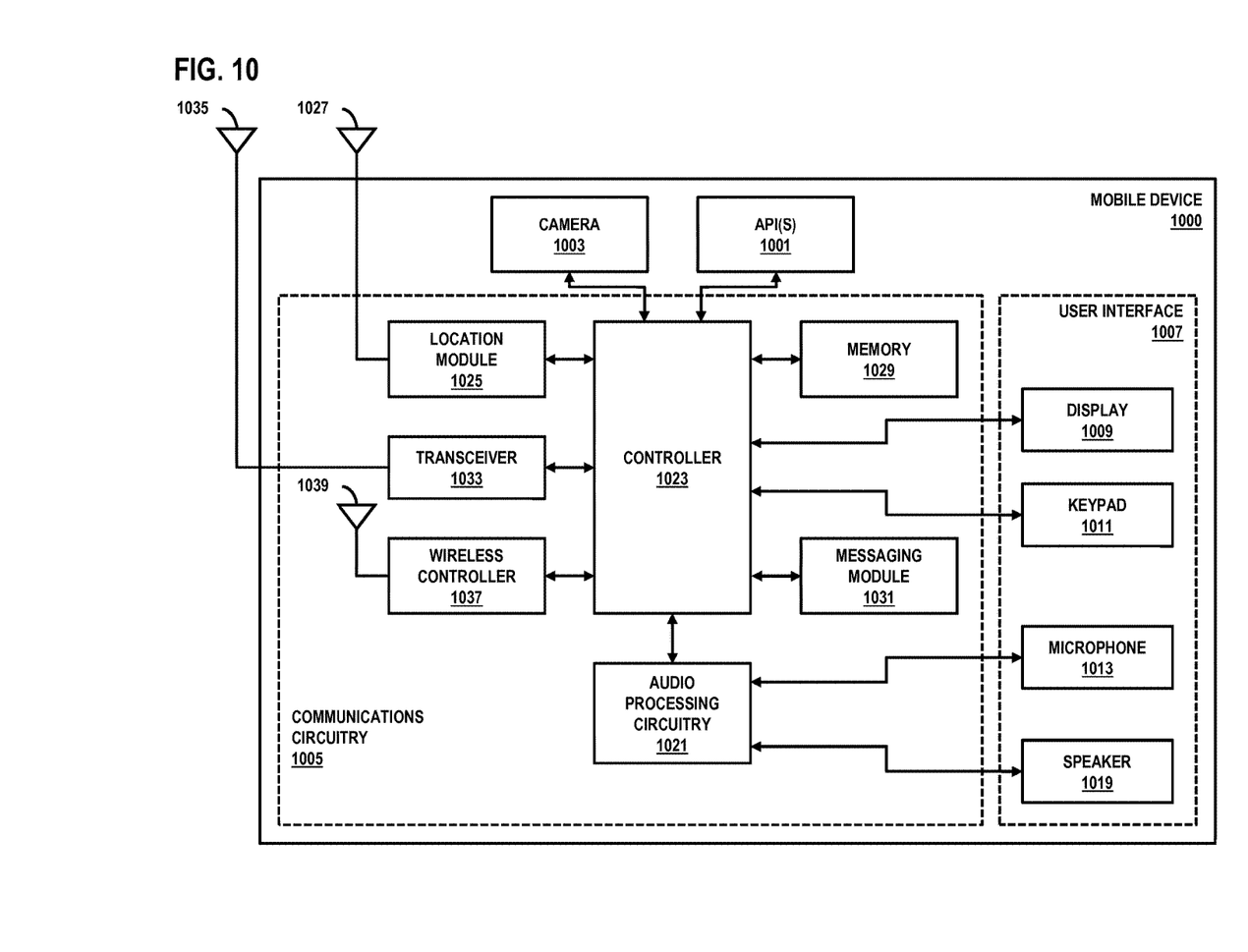
FIG. 10 is a diagram of a mobile device configured to facilitate various exemplary embodiments.

FIG. 10 is a diagram of a mobile device configured to facilitate a detection of a network, according to one embodiment. Mobile device 1000 (e.g., equivalent to the mobile devices 105) may comprise computing hardware (such as described with respect to FIGS. 8 through 10), as well as include one or more components configured to execute the processes described herein for facilitating a detection of a network. In this example, mobile device 1000 includes application programming interface(s) 1001, camera 1003, communications circuitry 1005, and user interface 1007. While specific reference will be made hereto, it is contemplated that mobile device 1000 may embody many forms and include multiple and/or alternative components.

According to exemplary embodiments, user interface 1007 may include one or more displays 1009, keypads 1011, microphones 1013, and/or speakers 1019. Display 1009 provides a graphical user interface (GUI) that permits a user of mobile device 1000 to view dialed digits, call status, menu options, and other service information. Specifically, the display 1009 may allow viewing of, for example, a PNL. The GUI may include icons and menus, as well as other text and symbols. Keypad 1011 includes an alphanumeric keypad and may represent other input controls, such as one or more button controls, dials, joysticks, touch panels, etc. The user thus can construct templates, enter field values, initialize applications, select options from menu systems, and the like. Specifically, the keypad 1011 may enable the inputting of characters and words. Microphone 1013 coverts spoken utterances of a user (or other auditory sounds, e.g., environmental sounds) into electronic audio signals, whereas speaker 1019 converts audio signals into audible sounds or utterances. A camera 1003 may be used as an input device to detect images, for example a QR code.

Communications circuitry 1005 may include audio processing circuitry 1021, controller 1023, location module 1025 (such as a GPS receiver) coupled to antenna 1027, memory 1029, messaging module 1031, transceiver 1033 coupled to antenna 1035, and wireless controller 1037 coupled to antenna 1039. Memory 1029 may represent a hierarchy of memory, which may include both random access memory (RAM) and read-only memory (ROM). Computer program instructions and corresponding data for operation can be stored in non-volatile memory, such as erasable programmable read-only memory (EPROM), electrically erasable programmable read-only memory (EEPROM), and/or flash memory. Memory 1029 may be implemented as one or more discrete devices, stacked devices, or integrated with controller 1023. Memory 1029 may store information, such as contact lists, preference information, and the like. As previously noted, it is contemplated, that functions performed by platform 101 may be performed by the mobile device 1000.

Additionally, it is contemplated that mobile device 1000 may also include one or more applications and, thereby, may store (via memory 1029) data associated with these applications for providing users with browsing functions, business functions, calendar functions, communication functions, contact managing functions, data editing (e.g., database, word processing, spreadsheets, etc.) functions, financial functions, gaming functions, imaging functions, messaging (e.g., electronic mail, IM, MMS, SMS, etc.) functions, multimedia functions, service functions, storage functions, synchronization functions, task managing functions, querying functions, and the like. As such, signals received by mobile device 1000 from, for example, platform 101 may be utilized by API(s) 1001 and/or controller 1023 to facilitate the sharing of information, and improving the user experience.

Accordingly, controller 1023 controls the operation of mobile device 1000, such as in response to commands received from API(s) 1001 and/or data stored to memory 1029. Control functions may be implemented in a single controller or via multiple controllers. Suitable controllers 1023 may include, for example, both general purpose and special purpose controllers and digital signal processors. Controller 1023 may interface with audio processing circuitry 1021, which provides basic analog output signals to speaker 1019 and receives analog audio inputs from microphone 1013.

Mobile device 1000 also includes messaging module 1031 that is configured to receive, transmit, and/or process messages (e.g., enhanced messaging service (EMS) messages, SMS messages, MMS messages, instant messaging (IM) messages, electronic mail messages, and/or any other suitable message) received from (or transmitted to) platform 101 or any other suitable component or facility of system 100. As such, messaging module 1031 may be configured to receive, transmit, and/or process information shared by the mobile device 1000. For example, platform 101 can send an SMS information relating to a template, code word, and the like.

It is also noted that mobile device 1000 can be equipped with wireless controller 1037 to communicate with a wireless headset (not shown) or other wireless network. The headset can employ any number of standard radio technologies to communicate with wireless controller 1037; for example, the headset can be BLUETOOTH enabled. It is contemplated that other equivalent short range radio technology and protocols can be utilized. While mobile device 1000 has been described in accordance with the depicted embodiment of FIG. 10, it is contemplated that mobile device 1000 may embody many forms and include multiple and/or alternative components.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
determining a network list indicating a plurality of network identifiers associated with a mobile device, each network identifier identifying one or more access points for a respective wireless network;
determining locality information based on sensor information detected by one or more sensors of the mobile device;
performing, using the locality information, a first lookup in a table, wherein the table stores a plurality of first records, each first record indicating sensor information and network identifiers, of the plurality of network identifiers, associated with the sensor information;
performing, when the table does not include a first record corresponding to the locality information, a second lookup in a second record of the table, wherein the second record indicates sensor information detected by one or more sensors of a second mobile device and network identifiers associated with the sensor information detected by the one or more sensors of the second mobile device, wherein the second mobile device is different from the mobile device;
selecting at least one of the plurality of network identifiers based on performing the first lookup or the second lookup; and
initiating a transmission of the selected at least one of the plurality of network identifiers by the mobile device.

2. The method of claim 1, further comprising:
determining energy information associated with an energy expenditure of the one or more sensors of the mobile device and an energy expenditure of at least one other sensor of the mobile device; and
selecting the one or more sensors of the mobile records to determine the locality information based on the energy information.

3. The method of claim 1, further comprising:
determining energy information associated with an energy expenditure of one or more operating modes of the one or more sensors of the mobile device; and
selecting an operating mode of the one or more operating modes based on the energy information, wherein the locality information is further based on the operating mode.

4. The method of claim 1, further comprising:
detecting a particular network identifier associated with a particular access point;
initiating an attachment of the mobile device to the particular access point; and
storing the particular network identifier in the network list based on the initiating of the attachment of the mobile device to the particular access point.

5. The method of claim 4, further comprising:
detecting, by the mobile device, particular sensor information based on the initiating of the attachment; and
associating the particular sensor information with the particular network identifier, wherein the selection of the at least one of the plurality of network identifiers is further based on the associating.

6. The method of claim 5, further comprising:
initiating a transmission, by the mobile device, of a record indicating the associating of the particular sensor information with the particular network identifier.

7. The method of claim 1, further comprising:
comparing the locality information to the plurality of first records.

8. The method of claim 7, wherein the plurality of first records are cached locally by the mobile device and the method further comprises:
initiating a receiving, by the mobile device, of one or more remote records from a remote repository based on the comparing; and
comparing the locality information to the one or more remote records, each record of the one or more remote records indicating sensor information and a network identifier, of the plurality of network identifiers, associated with the sensor information, wherein the selecting of the at least one of the plurality of network identifiers is further based on the comparing of the locality information to the one or more remote records.

9. The method of claim 8, wherein the initiating of the receiving comprises:
determining a user account associated with the mobile device; and
transmitting user account information indicating the user account.

10. An apparatus comprising:
at least one processor; and
at least one memory including computer program code for one or more programs,
the at least one memory and the computer program code configured to, with the at least one processor, cause the apparatus to:
determine a network list indicating a plurality of network identifiers associated with the apparatus, each network identifier identifying one or more access points for a respective wireless network;
determine locality information based on sensor information detected by one or more sensors of the apparatus;
perform a first lookup in a table based on the locality information, wherein the table stores a plurality of first records, each first record indicating sensor information and network identifiers, of the plurality of network identifiers, associated with the sensor information;
perform, when the table does not include a first record corresponding to the locality information, a second lookup in a second record of the table, wherein the second record indicates sensor information detected by one or more sensors of a second apparatus and network identifiers associated with the sensor information detected by the one or more sensors of the second apparatus, wherein the second apparatus is different from the apparatus;
select at least one of the plurality of network identifiers based on performing the first lookup or the second lookup; and
initiate a transmission of the selected at least one of the plurality of network identifiers by the apparatus.

11. The apparatus according to claim 10, wherein the at least one memory and the computer program code are further configured to, with the at least one processor, cause the apparatus to:
determine energy information associated with an energy expenditure of the one or more sensors of the apparatus and an energy expenditure of at least one other sensor of the apparatus; and
select the one or more sensors of the apparatus to determine the locality information based on the energy information.

12. The apparatus according to claim 10, wherein the at least one memory and the computer program code are further configured to, with the at least one processor, cause the apparatus to:
determine energy information associated with an energy expenditure of one or more operating modes of the one or more sensors of the apparatus; and
select an operating mode of the one or more operating modes based on the energy information, wherein the locality information is further based on the operating mode.

13. The apparatus according to claim 10, wherein the at least one memory and the computer program code are further configured to, with the at least one processor, cause the apparatus to:
detect a particular network identifier associated with a particular access point;
initiate an attachment of the apparatus to the particular access point; and
store the particular network identifier in the network list based on the initiating of the attachment of the apparatus to the particular access point.

14. The apparatus according to claim 13, wherein the at least one memory and the computer program code are further configured to, with the at least one processor, cause the apparatus to:
detect particular sensor information based on the initiating of the attachment; and
associate the particular sensor information with the particular network identifier, wherein the selection of the at least one of the plurality of network identifiers is further based on the associating.

15. The apparatus according to claim 14, wherein the at least one memory and the computer program code are further configured to, with the at least one processor, cause the apparatus to:
initiate a transmitting of a record indicating the associating of the particular sensor information with the particular network identifier.

16. The apparatus according to claim 10, wherein the at least one memory and the computer program code are further configured to, with the at least one processor, cause the apparatus to:
compare the locality information to the plurality of first records.

17. The apparatus according to claim 16, wherein the one or more records are cached locally by the apparatus and the at least one memory and the computer program code are further configured to, with the at least one processor, cause the apparatus to:
- initiate a receiving of one or more remote records from a remote repository based on the comparing; and
- compare the locality information to the one or more remote records, each record of the one or more remote records indicating sensor information and a respective network identifier, wherein the selecting of the at least one of the plurality of network identifiers is further based on the comparing of the locality information to the one or more remote records.

18. The apparatus according to claim 17, wherein the at least one memory and the computer program code are further configured to, with the at least one processor, cause the apparatus to:
- determine a user account associated with the apparatus; and
- transmit user account information indicating the user account.

19. A non-transitory storage medium storing instructions executable by a processor of a computational device to:
- determine a network list indicating a plurality of network identifiers associated with a mobile device, each network identifier identifying one or more access points for a respective wireless network;
- determine locality information based on sensor information detected by one or more sensors of the mobile device;
- perform a first lookup in a table based on the locality information, wherein the table stores a plurality of first records, each first record indicating sensor information and network identifiers, of the plurality of network identifiers, associated with the sensor information;
- perform, when the table does not include a first record corresponding to the locality information, a second lookup in a second record of the table, wherein the second record indicates second sensor information detected by one or more sensors of a second mobile device and network identifiers associated with the second sensor information, wherein the second mobile device is different from the mobile device;
- select at least one of the plurality of network identifiers based on performing the first lookup or the second lookup; and
- initiate a transmission of the selected at least one of the plurality of network identifiers by the mobile device.

20. The non-transitory storage medium of claim 19, further storing instructions executable by the processor of the computational device to:
- determine energy information associated with an energy expenditure of the one or more sensors of the mobile device and an energy expenditure of at least one other sensor of the mobile device; and
- select the one or more sensors of the mobile device to determine the locality information based on the energy information.

21. The non-transitory storage medium of claim 19, further storing instructions executable by the processor of the computational device to:
- determine energy information associated with an energy expenditure of one or more operating modes of the one or more sensors of the mobile device; and
- select an operating mode of the one or more operating modes based on the energy information, wherein the locality information is further based on the operating mode.

* * * * *